United States Patent [19]

Toyoda et al.

[11] Patent Number: 4,932,290
[45] Date of Patent: Jun. 12, 1990

[54] POWER SEAT APPARATUS

[75] Inventors: Kanshiro Toyoda; Tadasu Yoshida, both of Toyota, Japan

[73] Assignee: Aisin Seiki Kabushiki Kaisha, Kariya, Japan

[21] Appl. No.: 226,575

[22] Filed: Aug. 1, 1988

[51] Int. Cl.⁵ .............................................. F16H 37/06
[52] U.S. Cl. ................................ 74/665 N; 74/665 Q; 192/48.8; 192/82 P; 248/394
[58] Field of Search ......... 74/665 F, 665 G, 665 GA, 74/665 Q, 665 P, 665 N, 665 L; 192/48.8, 82 P; 248/394, 395, 396

[56] References Cited

U.S. PATENT DOCUMENTS

| | | | |
|---|---|---|---|
| 2,924,265 | 2/1960 | Himka | 248/394 X |
| 3,240,464 | 3/1966 | Pickles | 248/394 X |
| 4,015,812 | 4/1977 | Heesch | 248/394 |
| 4,073,459 | 2/1978 | Pickles | 248/394 |
| 4,186,904 | 2/1980 | Reinmoller et al. | 248/395 |
| 4,488,699 | 12/1984 | Chevalier | 248/396 |
| 4,530,481 | 7/1985 | Kluting et al. | 248/394 |
| 4,720,070 | 1/1988 | Nishino | 248/394 |

FOREIGN PATENT DOCUMENTS 58-97528 7/1983 Japan.

Primary Examiner—Dwight G. Diehl
Attorney, Agent, or Firm—Finnegan, Henderson, Farabow, Garrett & Dunner

[57] ABSTRACT

A power seat apparatus in a vehicle body includes a first shaft through which the rotational torque is transmitted to a first mechaism for moving a front portion of a seat-cushion vertically, a second shaft through which the rotational torque is transmitted to a second mechanism for moving a rear portion of the seat-cushion vertically and a third shaft through which the rotational torque is transmitted to a third mechanism for moving the seat-cushion in the lengthwise direction. The power seat apparatus further includes a mechanical control device engaging a third clutch to the third shaft during the disengagement of a first clutch from the first shaft and a second clutch from the second shaft and disengaging the third clutch from the third shaft during either the engagement of the first clutch to the first shaft or the engagement of the second clutch to the second shaft. With this arrangement no solenoid needs to be used in the control device, and consequently noise emission is not generated.

3 Claims, 5 Drawing Sheets

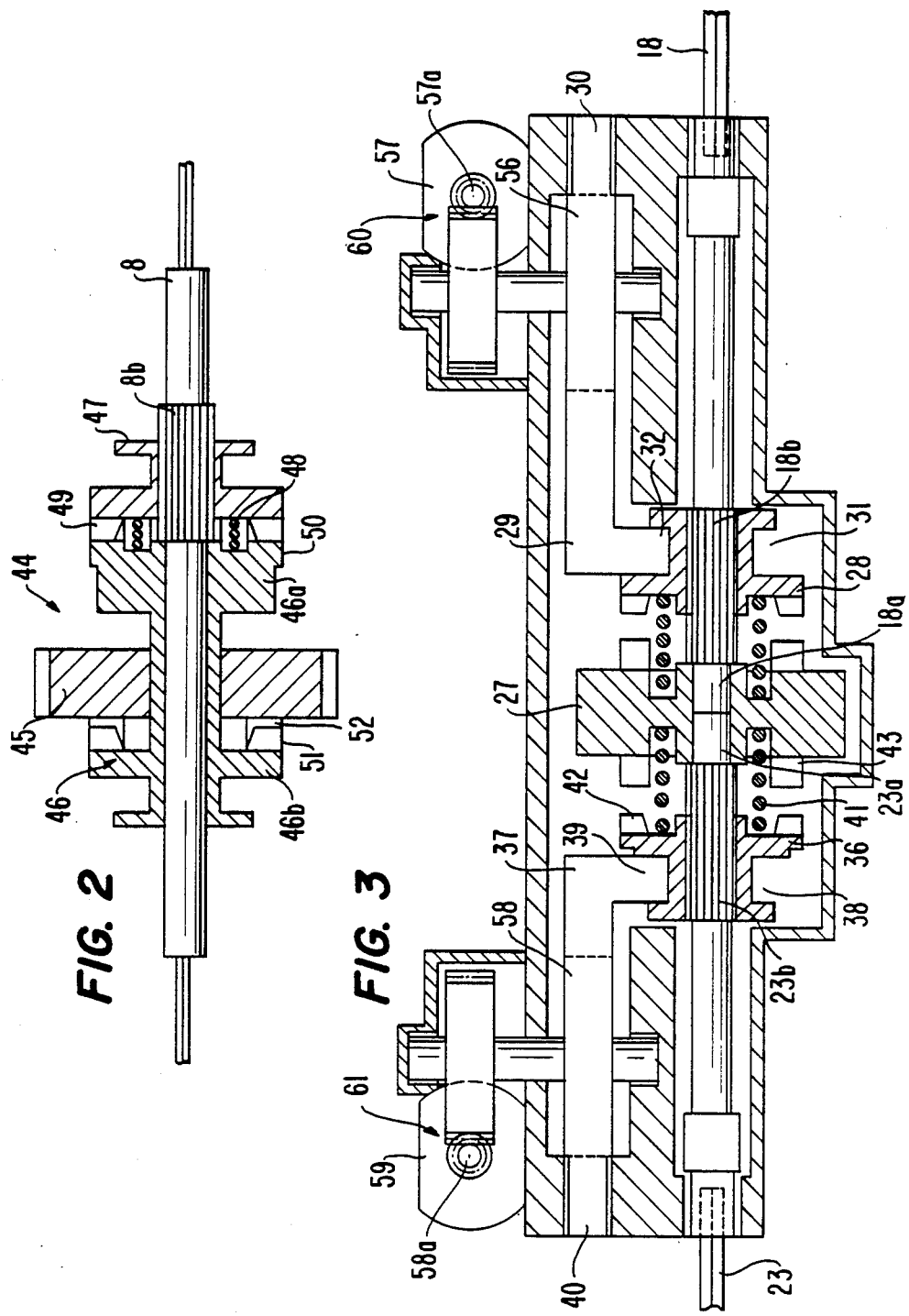

POWER SEAT APPARATUS

BACKGROUND OF THE INVENTION

1. Field of the Invention

The present invention relates to a power seat apparatus, and more particularly to a power seat apparatus in which a seat-cushion may be movable in the horizontal direction and/or in the vertical direction of a vehicle body.

2. Description of the Prior Art

A conventional power seat apparatus of the type, which is shown in Japanese Patent Laid-Open Print No. 58-97528, published without examination on Jul. 10, 1983, includes lower rail means fixedly mounted on a floor of a vehicle body, upper rail means slidably mounted on the lower rail means, a first mechanism provided at a front portion of the upper rail means for lifting or lowering a front portion of a seat-cushion, a second mechanism provided at a rear portion of the upper rail means for lifting or lowering a rear portion of the seat-cushion and a third mechanism provided at a portion of the upper rail means for moving the upper rail means along the lower rail means. In the conventional power seat apparatus, when the rotational torque is transmitted to the first mechanism, the second mechanism and the third mechanism through a first shaft, a second shaft and a third shaft, the front portion of the seat-cushion is moved vertically, the rear portion of the seat-cushion is moved vertically and the seat-cushion itself is moved in the horizontal direction of the vehicle body, respectively.

The first shaft is connected to a first gear which is driven by a reversible motor via a first solenoid clutch, the second shaft is connected to a second gear which is meshed with the first gear via a second solenoid clutch and the third shaft is connected to a third gear which is meshed with the second gear via a third solenoid clutch. For transmitting the rotational torque from the motor to any one of shafts, the corresponding solenoid clutch has to be actuated, which results in noise emittance. Furthermore, since each shaft has to be provided with corresponding gears, the whole construction of the power seat becomes complex.

SUMMARY OF THE INVENTION

It is, therefore, a principal object of the present invention to provide a power seat apparatus without the aforementioned drawbacks.

Another object of the present invention is to provide a power seat apparatus in which no solenoid clutch is employed, thereby eliminating emission of noise.

According to the present invention, a power seat apparatus comprises lower rail means fixedly mounted on a floor of a vehicle body; upper rail means slidably mounted on the lower rail means; a first mechanism provided at a front portion of the upper rail means for lifting or lowering a front portion of a seat-cushion; a first shaft through which the rotational torque is transmitted to the first mechanism for the actuation thereof; second mechanism provided at a rear portion of the upper rail means for lifting or lowering a rear portion of the seat-cushion; a second shaft through which the rotational torque is transmitted to the second mechanism for the actuation thereof; a third mechanism provided at a portion of the upper rail means for moving the upper rail means along the lower rail means; a third shaft through which the rotational torque is transmitted to the moving means for the actuation thereof; a main motor; a first gear driven by the main motor; a first clutch disposed between one side of the first gear and the first shaft; a second clutch disposed between the other side of the first gear and the second shaft; a second gear engaged with the first gear; a third clutch disposed between the second gear and the third shaft; and a mechanical control device engaging the third clutch during the disengagement of the first and second clutches and disengaging the third clutch during either of the engagement of the first and second clutches.

BRIEF DESCRIPTION OF THE DRAWINGS

The above and other objects, features and advantages of the present invention will become apparent and more readily appreciated from the following detailed description of preferred exemplary embodiment of the invention, taken in connection with the accompanying drawings, in which:

FIG. 2 is a cross-sectional view of a third clutch the seat apparatus in FIG. 1;

FIG. 3 is a cross-sectional view taken along line A—A in FIG. 1;

The preferred embodiment will be explained hereinafter with reference to FIG. 7.

DETAILED DESCRIPTION OF THE PREFERRED EMBODIMENT

Figure 7:
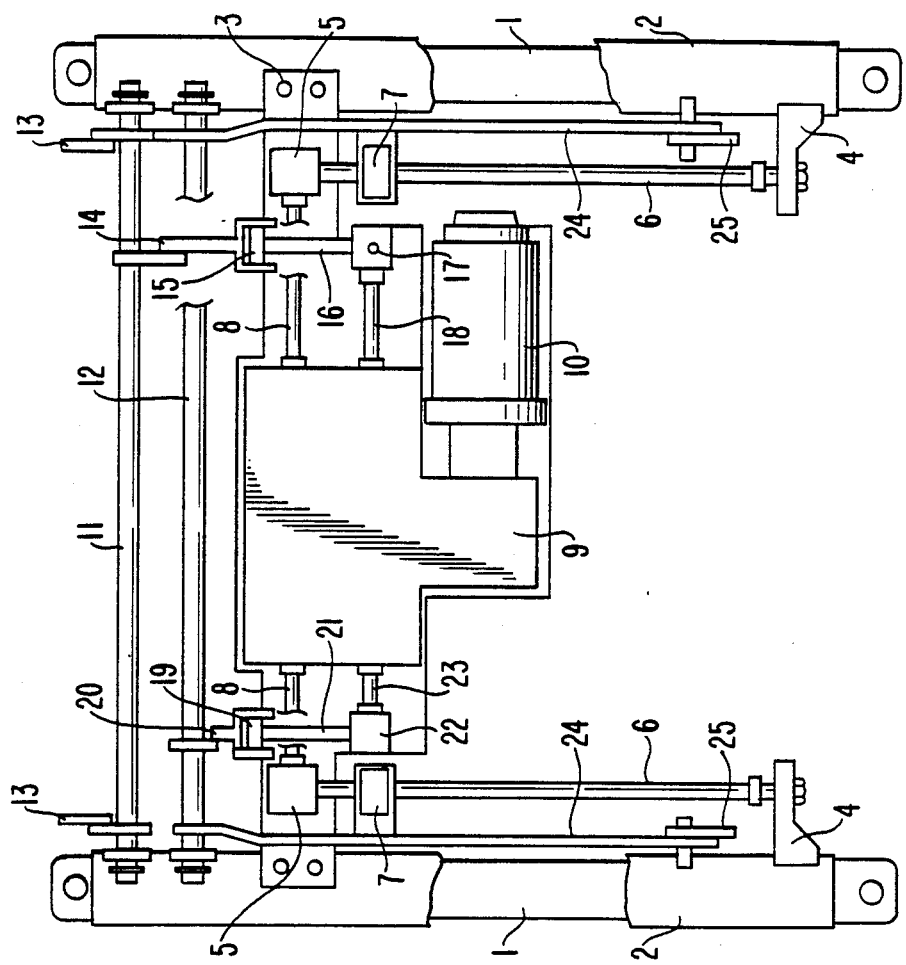
FIG. 7 is the plane view of an inside construction of a power seat apparatus in FIG. 1.

Referring to FIG. 7, a pair of upper rails 2 are slidably mounted on a pair of lower rails 1, respectively, which are fixedly connected to a floor of a vehicle body. The upper rails 2 are connected by a plate 3 for the unitary movement thereof. Between a bracket 4 which is provided at a rear portion of each upper rail 2 and a gear-box 5 mounted on the plate 3, there is provided a screw-shaft 6. The screw-shaft 6 is threadably passed through a nut 7 supported on the lower rail 1. The gear-box 5 is operatively connected to a main motor 10 which is of the reversible type through a shaft 8 and a gear box 9. An inner configuration of the gear box 9 will be detailed hereinafter. Upon rotation of the shaft 8, the rotational torque is transmitted through the gear-box 5 to the screw-shaft 6, which results in the rotation thereof. Since the nut 7 through which the screw-shaft 6 is threadably passed is fixed to the lower rail 1, the screw-shaft 6 is moved, according to the rotational direction thereof, in the forward direction or rearward direction. Thus, a seat-cushion (not shown) on the upper rails 2 connected by the plate 3 is moved in the forward direction or rearward direction relative to the lower rails 1, according to the rotational direction of the screw-shaft 6.

Between front portions of the respective upper rails 2, a first torque-rod 11 and a second torque-rod 12 are rotatably supported. At opposite end portions of the first torque-rod 11 there is provided a pair of brackets 13 for supporting a front portion of the seat-cushion. A link 14 is connected at one end portion and the other end portion thereof to the first torque-rod 11 and a nut 15, respectively. A shaft 16 is threaded into the nut 15 and is operatively connected to the main motor 10 through a gear-box 17, a shaft 18 and the gear-box 9. Upon rotation of the shaft 18, the nut 15 is moved along the first screw-rod 16, thereby lifting or lowering the link 14. Thus, the first torque-rod 11 is rotated through an angle results in the upward or downward movement of the front portion of the seat-cushion.

A link 20 is connected at one end portion and the other end portion thereof to the second torque-rod 12 and a nut 19, respectively. A shaft 21 is threaded into the nut 19 and is operatively connected to the main motor 10 through a gear-box 22, a shaft 23 and the gear-box 9. At opposite end portions of the second torque-rod 12, there is provided a pair of links 24, each of which is connected to a link 25 for supporting a rear portion of the seat-cushion. Upon rotation of the shaft 23, the nut 19 is moved along the second screw-rod 21, thereby rotating the second torque-rod 12 through an angle. Since resulting rotation thereof is transmitted to the links 25 and 25 through respective links 24, the links 25 are lifted or lowered. Thus, the rear portion of the seat-cushion is moved in the upward or downward direction.

Hereinafter, a detailed construction of the gear-box 9 is described with reference to FIGS. 1 through 6. In a housing 26 of the gear-box 9, there is disposed a first gear 27 having an axial bore 27a at a central portion thereof. A distal end 18a of the shaft 18 and a distal end 23a of the shaft 23 are inserted into the bore 27a of the first gear 27 from the opposite direction so that the first gear 27 may be rotated in the housing 26. A first clutch 28 is slidably mounted on a splined portion 18b of the shaft 18 and is rotatable therewith. A shift fork 29 with a rack 30 in the lengthwise direction thereof is positioned in parallel with the shaft 18 and has a rectangular projection 32 which is snugly fitted into an annular groove 31 of the clutch 28. Between the clutch 28 and a right side of the gear 27, there is interposed an expansion spring 33 so as to disengage a pawl 34 of the clutch 28 from a pawl 35 on the right side of the gear 27. Thus, the rotation of the gear 27 which is driven by the main motor 10 may not be transmitted to the shaft 18.

A second clutch 36 is slidably mounted on a splined portion 23b of the shaft 23 and is rotatable therewith. A shift fork 37 with a rack 40 in the lengthwise direction thereof is positioned in parallel with the shaft 23 and has a rectangular projection 39 which is snugly fitted into an annular groove 38 of the clutch 36. Between the clutch 36 and a left side of the gear 27, there is interposed an expansion spring 41 so as to disengage a pawl 42 of the clutch 36 from a pawl 43 on the left side of the gear 27. Thus, the rotation of the gear 27 may not be transmitted to the shaft 23.

On the shaft 8, there is provided clutch means 44 having a third clutch 47 with pawls 49 and a switching sleeve 46. The clutch 47 is slidably mounted on a splined portion 8b of the shaft 8 and is rotatable therewith. The switching sleeve 46 has a first member 46a in the form of radial flange and a second member 46b in the form of radial flange. On the first member 46a, there are provided pawls 50 which engage with respective pawls 49. An expansion spring 48 is disposed between the clutch 47 and the first member 46a. On the second member 46b, there are provided pawls 51 which engage with respective pawls 52 provided on a left side of a second gear 45. The second member 46b acts as a fourth clutch. On the switching sleeve 46, there is rotatably mounted the second gear 45 which is meshed with the first gear 27. The third clutch 47 is connected to a third shift fork 52 with a rack 53, and the second member 46b of the switching member 46 is connected to a fourth shift fork 54 with a rack 55.

The rack 30 of the first shift fork 29 and the rack 53 of the third shift fork 52 are in meshing engagement with a common first pinion 56 which is interposed therebetween. The pinion 56 is operatively connected to a shaft 57a of a first auxilially motor 57 via a reducer 60. Similarly, the rack of the second shift fork 37 and the rack 55 of the fourth shift fork 54 are in meshing engagement with a common second pinion 58 which is interposed therebetween. The pinion 58 is operatively connected to a shaft 58a of a second auxilially motor 58 via a reducer 61. Each of the auxilially motors 57 and 58 is of a reversible configuration type.

The power seat apparatus is operated as follows:

Forward or rearward movement of the seat cushion

Figure 1:
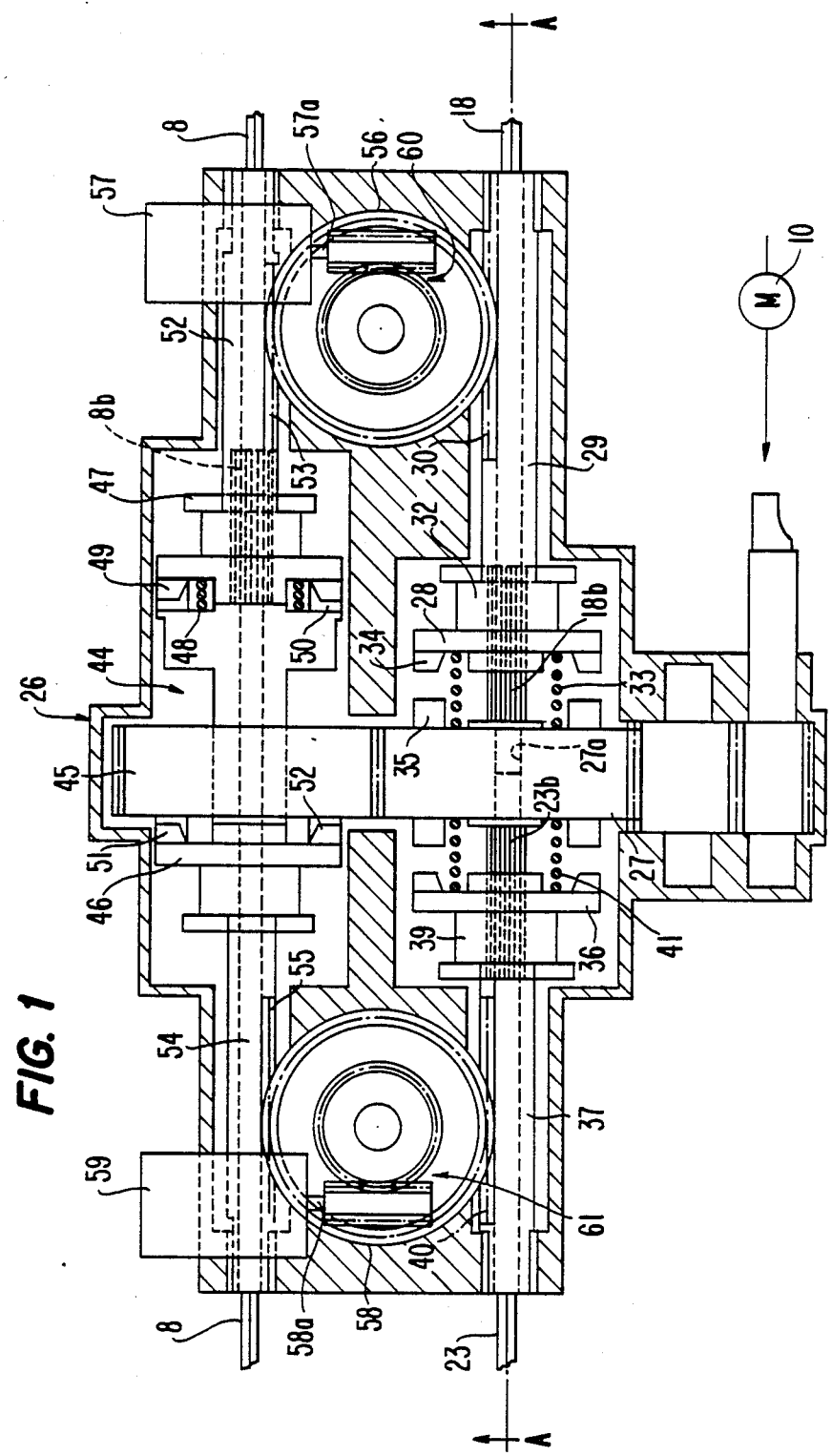
FIG. 1 is a cross-sectional side view of a mechanical control device of a power seat apparatus according to the present invention.

Upon counter-clockwise rotation of the first pinion 56 by the first auxilially motor 57, the first clutch 28 is disengaged from the first gear 27 and the third clutch 47 is brought into engagement with the first member 46a of the switching member 46. Simultaneously, upon clockwise rotation of the second pinion 58 by the second auxilially motor 59, the second clutch 36 is brought into disengagement from the first gear 27 and the fourth clutch 46 is brought into engagement with the second gear 45. Under such condition as shown in FIG. 1, upon actuation of the main motor 10, the gears 27 and 45 are brought into rotation. Though the first gear 27 is being rotated freely relative to the first shaft 18, the rotation of the second gear 45 is transmitted to the third shaft 8 through the fourth clutch 46b, the switching member 46 and the third clutch 47. Thus, the seat-cushion is moved in the forward or rearward direction according to the rotational direction of the main motor 10.

Vertical movement of the front portion of the seat cushion

Figure 4:
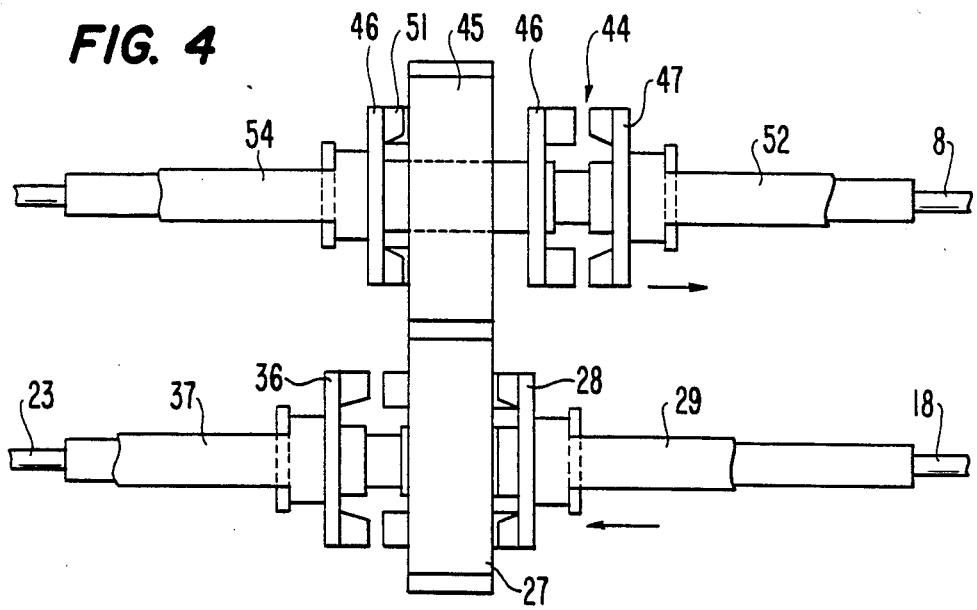
FIG. 4 shows the relationship between respective clutches when a front portion of a seat-cushion is moved vertically.

Under a condition as shown in FIG. 1, upon clockwise rotation of the first pinion 56 by the first auxilially motor 57, the first shift fork 29 and the third shift fork 52 are moved in the leftward direction and in the rightward direction, respectively. Then, the third clutch 44 is disengaged from the second gear 45 and the first clutch 28 is brought into engagement with the first gear 27 (FIG. 4). Thus, the rotation of the motor 10 is transmitted only to the first shaft 18 through the first gear 27 and the first clutch 28, thereby rotating the first shaft 18. Thus, the front portion of the seat cushion is moved in the upward direction or in the downward direction in accordance with the rotational direction of the motor 10.

Vertical movement of the rear portion of the seat cushion

Figure 5:
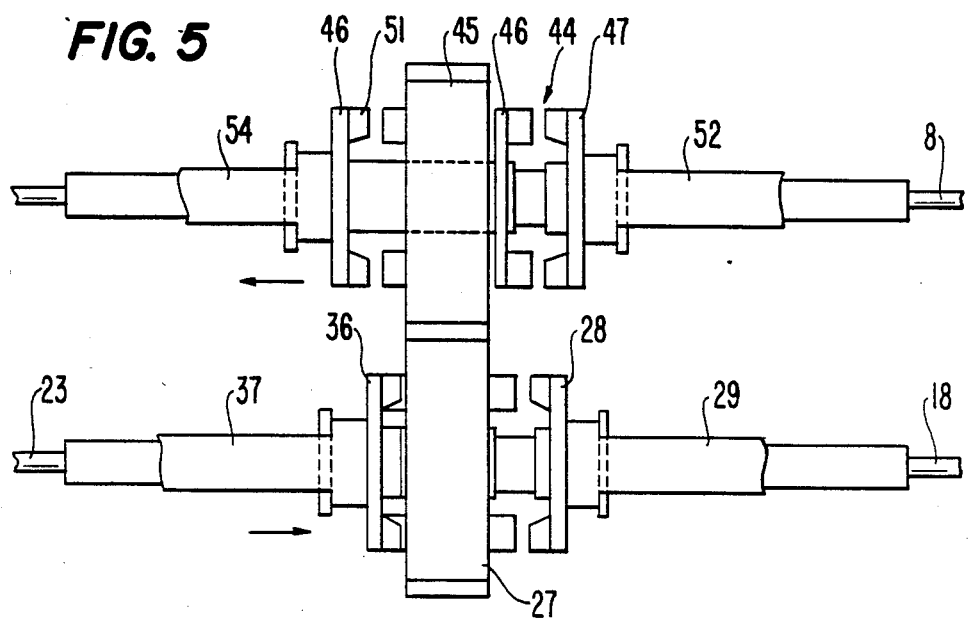
FIG. 5 shows the relationship between respective clutches when a rear portion of a seat-cushion is moved vertically.

Under a condition as shown in FIG. 1, upon counter-clockwise rotation of the second pinion 59 by the second auxilially motor 59, the second shift fork 37 is moved in the rightward direction, thereby engaging the second clutch 36 with the first gear 27. Simultaneously, the switching member 46 is moved in the leftward direction with resulting that the fourth clutch 46b is disengaged from the second gear 45 and the first member 46a is disengaged from the third clutch 47 (FIG. 5). Thus, the rotational torque transmitted only to the second shaft 23 from the motor 10 through the first gear 27 is further transmitted to the links 24, thereby moving the rear portion of the seat cushion in the upward direction or in the downward direction in accordance with the rotational direction of the motor 10.

Figure 6:
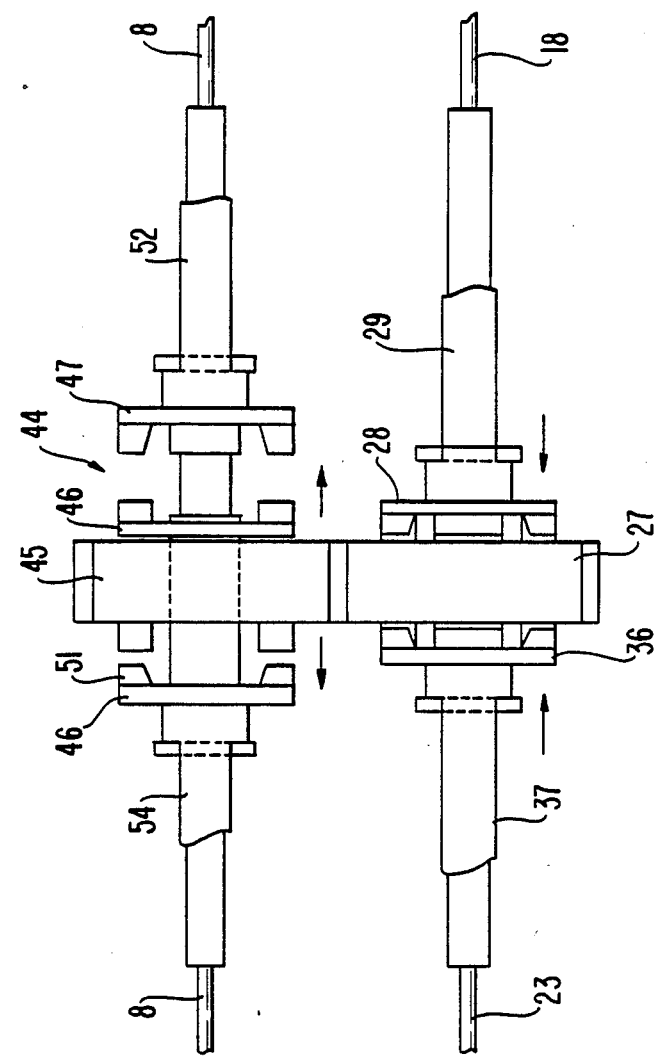
FIG. 6 shows the relationship between respective clutches when a front portion and a rear portion of a seat-cushion are moved vertically at the same time.

Simultaneous vertical movements of the front and rear portions of the seat-cushion Under a condition as shown in FIG. 1, upon clockwise rotation of the first pinion 56 by the first auxilially motor 57, the first clutch 28 is brought into engagement with the first gear 27 and the third clutch 47 is disengaged from the second gear 45. Simultaneously, upon counter-clockwise rotation of the second pinion 58 by the second auxilially motor 59, the second clutch 36 is brought into engagement with the first gear 27 and the fourth clutch 46b is disengaged from the second gear 45 (FIG. 6). Thus, both of the shafts 18 and 23 are rotated simultaneously due to the rotation of the first gear 27 driven by the motor 10, thereby moving simultaneously the front and rear portions of the seat-cushion in the upward direction or in the downward direction in accordance with the rotational direction of the motor 10. During the operation of the motor 10, the second gear 45 is being rotated freely relative to the third clutch 47 and the fourth clutch 46b.

Obviously, many modifications and variations of the present invention are possible in light of the above teaching. It is therefore to be understood that within the scope of the appended claims the invention may be practiced otherwise than as specifically described herein.

What is claimed is:

1. A power seat apparatus for lifting and lowering a seat cushion of a vehicle comprising:

lower rail means fixedly mounted on the floor of the vehicle;

upper rail means slidably mounted on the lower means, the upper rail means including means for moving the upper rail means along the lower rail means;

first elevating means provided at a front portion of said upper rail means for lifting and lowering a front portion of the seat cushion;

second elevating means provided at a rear portion of said upper rail means for lifting and lowering a rear portion of the seat cushion;

a reversible main motor for driving the first and second elevating means;

a first gear driven by said main motor;

a first shaft extending coaxially from a first side of said first gear for transmitting rotational torque from said main motor to said first elevating means;

a first clutch slidably disposed on said first side of said first gear along said first shaft and rotatable therewith;

a first expansion spring disposed between said first clutch and said first side of said first gear;

a first shift fork mounted on said first shaft, said first shift fork being movable with the axial movement of said first shaft and rotationally stationary with respect thereto;

a second shaft extending coaxially from a second side of said first gear for transmitting torque from said main motor to said second elevating means;

a second clutch slidably disposed on the second side of said first gear along the second shaft and being rotatable therewith;

a second expansion spring disposed between said second clutch and the second side of the first gear;

a second shift fork mounted on said second shaft, said second shift fork being movable with the axial movement of said second shaft and rotationally stationary with respect thereto;

a second gear disposed in meshing engagement with said first gear;

a third shaft extending through and coaxial with said second gear;

a switching sleeve slidably disposed on said third shaft and rotatable therewith, said switching sleeve including a first member disposed at a first end thereof and a second member including a fourth clutch disposed at a second end thereof;

a third clutch slidably mounted on said third shaft adjacent said first member and rotatable with the third shaft;

a third expansion spring disposed between said first member and said third clutch;

a third shift fork mounted on said third shaft, said third shift fork being movable with the axial movement of said first member and rotationally stationary with respect thereto;

a fourth shift fork mounted on said third shaft, said fourth shift fork being movable with the axial movement of said second member and rotationally stationary with respect thereto; and shift fork control means for controlling the movement of said shift forks, the shift fork control means including first means for moving said first shift fork and said third shift fork in opposite directions simultaneously and second means for moving said second shift fork and said fourth shift fork in opposite directions simultaneously.

2. A power seat apparatus according to claim 1, wherein said first means includes a first pinion disposed between said first shift fork and said third shift fork and a first, reversible auxiliary motor for rotating said first pinion, and said second means includes a second pinion disposed between said second shift fork and said fourth shift fork and a second, reversible auxiliary motor for rotating said second pinion.

3. A power seat apparatus according to claim 1, wherein each of said first, second, third and fourth shift forks includes a projection and each of the respective first, second and third shafts has an annular groove for receiving each said projection.

* * * * *